United States Patent
Janssen et al.

(10) Patent No.: US 7,978,266 B2
(45) Date of Patent: Jul. 12, 2011

(54) TICKER PROCESSING IN VIDEO SEQUENCES

(75) Inventors: Frank Janssen, Langen (DE); Sven Salzer, Butzbach (DE)

(73) Assignee: Panasonic Corporation, Osaka (JP)

( * ) Notice: Subject to any disclaimer, the term of this patent is extended or adjusted under 35 U.S.C. 154(b) by 1565 days.

(21) Appl. No.: 11/098,675

(22) Filed: Apr. 5, 2005

(65) Prior Publication Data

US 2005/0253964 A1 Nov. 17, 2005

(30) Foreign Application Priority Data

Apr. 30, 2004 (EP) .................... 04010304

(51) Int. Cl.
 *H04N 9/64* (2006.01)
 *H04N 7/01* (2006.01)
(52) U.S. Cl. .................... 348/459; 348/452
(58) Field of Classification Search ............ 348/416, 348/412, 413, 398, 407, 403, 405, 415, 384, 348/390, 401, 409, 402, 700, 699, 43, 51, 348/54, 459, 701, 443; 382/199, 233, 232; 375/240.28, 240.26, 240.01, 240.15, 240.16, 375/240.24, 240.25
See application file for complete search history.

(56) References Cited

U.S. PATENT DOCUMENTS

| | | | | |
|---|---|---|---|---|
| 5,347,312 A | * | 9/1994 | Saunders et al. | 348/443 |
| 5,471,239 A | * | 11/1995 | Hill et al. | 348/155 |
| 5,565,921 A | * | 10/1996 | Sasaki et al. | 375/240.13 |
| 5,617,149 A | * | 4/1997 | Lee et al. | 348/699 |
| 6,509,930 B1 | * | 1/2003 | Hirano et al. | 348/452 |
| 6,778,221 B1 | | 8/2004 | Nishioka et al. | |
| 2004/0085480 A1 | | 5/2004 | Salzer et al. | |

FOREIGN PATENT DOCUMENTS

| | | |
|---|---|---|
| EP | 0883298 A2 | 12/1998 |
| EP | 1006723 A2 | 6/2000 |
| EP | 1198139 A1 | 4/2002 |
| EP | 1404130 A1 | 3/2004 |

OTHER PUBLICATIONS

Seungjoon Yang et al., "Motion Compensation Assisted Motion Adaptive Interlaced-To-Progressive Conversion", IEEE International Conference on Image Processing 2003, vol. 2, pp. 909-912, XP010669766.

* cited by examiner

*Primary Examiner* — Behrooz Senfi
(74) *Attorney, Agent, or Firm* — Wenderoth, Lind & Ponack, L.L.P.

(57) ABSTRACT

An improved motion compensated interpolation of images in video sequences, in particular, for use in up-conversion processing. In order to achieve a smooth object motion in the interpolated image sequence, separate image areas are processed differently if an image change occurs in the video sequence. While for one image area motion compensation is suspended, the other image area is subjected to motion compensated interpolation.

23 Claims, 4 Drawing Sheets

TICKER PROCESSING IN VIDEO SEQUENCES

BACKGROUND OF THE INVENTION

The present invention relates to an improved motion compensated generation of new image data. In particular, the present invention relates to a method for generating image data based on motion compensated data stemming from other images, wherein the other images comprise separate image areas.

Motion compensation is employed in an increasing number of applications, in particular in digital signal processing of up-to-date television receivers. Specifically, modern television receivers perform a frame-rate conversion, especially in form of a motion compensated up-conversion, in order to increase the picture quality of the reproduced images. Motion compensated up-conversion is performed, for instance, for video sequences having a field or frame rate of 50 Hz to higher frequencies like 60 Hz, 66.67 Hz, 75 Hz, 100 Hz, etc. While a 50 Hz input signal frequency mainly applies to television signals broadcast in accordance with PAL or SECAM standards, NTSC based video signals have a field rate of 60 Hz. A 60 Hz input video signal maybe up-converted to higher frequencies like 72 Hz, 80 Hz, 90 Hz, 120 Hz, etc.

Frame rate conversion algorithms require the generation of intermediate images which reflect the video content at temporal positions different from that of the input video sequence of, for instance, 50 Hz or 60 Hz. During interpolation of image data of the input images, the motion of moving objects has to be taken into account in order to appropriately reflect changes of the image content caused by object motion.

The motion to be used during interpolation of the image data is determined based on the two closest images of the input video sequence. Generally motion estimation is performed on a block basis. In order to avoid visible block structures in the motion compensated images, the motion vectors determined on a block basis are preferably assigned to each individual pixel wherein the resulting field of motion vectors is subjected to filtering in order to smoothen sharp transitions.

In accordance with the motion vector assigned to a particular image position, motion compensation shifts the image data of the image position referenced by the motion vector. The amount of shifting image data of the referenced images does not only depend on the length of the received motion vector but further depends on the relative temporal position of the new image to be generated between the previous and subsequent images.

When generating new image data from two images, preferably the previous and subsequent images, the motion compensation algorithm references image data in the previous and the subsequent images. While the image data from the previous image is shifted forward in the motion vector's direction, the image data from the subsequent image is shifted backwards. The amount of forward and backward shift is determined in accordance with the temporal position of the new image with respect to the referenced images. While the shift of the forward shift is executed in accordance with a calculated fraction of the motion vector's length, the backward shift is performed with the complementary negative fraction of the motion vector. The referenced pixel values at each pixel position are interpolated. The interpolation can also be based on a weighing of the image data from the referenced images based on the temporal position with respect to the newly generated image.

The conventional approach for performing a motion estimation is illustrated in FIG. 1A. From an input sequence 101-113, image data of two adjacent images is used in order to generate motion compensated new image data 130. The newly generated image data 130 reflects the temporal position of moving object 100 within the image sequence in accordance with the temporal position of the new image data 130. As can be seen from FIG. 1A, the position of the moving object 100 in the new image 130 is in-between the positions of images 102, 103 employed for motion compensation. Thus, image 130 correctly reflects the motion phase of the moving object 100.

Each image of the input image sequence 101-113 includes of two separate image areas. Specifically, a ticker window 123 is overlaid on a background image 122. Such a separate image portion is becoming increasingly popular in broadcast television signals. The overlaid ticker window is usually in the form of a text banner inserted at the bottom area of the video image. The text banner displays service information provided by the broadcaster. The displayed service information may either relate to the displayed image content related to program information or to a particular news service such as stock exchange rates. The individual position for inserting a ticker window into the video image may differ depending on the broadcaster or the broadcaster's country.

As illustrated in FIG. 1A, the text displayed in the ticker window 123 is shifted leftwards such that a continuous stream of text moving with a predefined speed is passing through the display screen.

Although, the separate image portions 123 and the background image 122 relate to a different image content, motion compensation provides an accurate generation of new image data for both image portions.

In order to detect scene changes 120 in an input video signal sequence 101-113, the signal processing of the present invention for motion compensated interpolation performs a scene change detection. The scene change detector detects abrupt image content changes between the images involved in the generation of a new image. Details for implementing an image scene detection are known, for instance, from EP-A-0 780 776.

If a scene change 120 is detected between two images 103, 111 involved, the motion compensated interpolation is inhibited in order to prevent the introduction of artefacts into the interpolation image 140. For this purpose, the motion compensation algorithm is replaced by another predefined interpolation algorithm. Preferably the image 140 is generated by only referring to a single one of the two images 103, 111 which would have been referenced by motion compensation. Preferably, a new image data 140 is generated based on linear interpolation of the current image 111.

As the linear interpolation illustrated in FIG. 1B only refers to a single image for all image areas 122, 123, the smooth motion of the text in the ticker window 143 is interrupted and a jerky appearance produced.

After the scene change 120 has taken place, the motion compensated interpolation is continued as illustrated in FIG. 1C.

A scene change 120 detected for a complete image does not automatically also apply to the overlaid ticker window 123. In general, a scene change in the background image 122 will cause a scene change detection signal. However, the appearance of the ticker window, which only represents a small proportion of the total image, has not changed. An improved motion compensated interpolation at scene cuts in accordance with the approach illustrated in FIG. 1B adversely effects the appearance of motion in a ticker window area.

The present invention aims to overcome this drawback and provides an improved method and signal processor for generating new image data.

This is achieved by the features of independent claims.

SUMMARY OF THE INVENTION

According to a first aspect of the present invention, a method for generating image data from video data of images in a video sequence is provided. The method determines a separate image area which relates to a different image content. A scene change between two images selected for generating image data is detected. New image data is generated based on motion compensation if a scene change has not been detected. If a scene change has been detected, the new image data is generated based on interpolation of image data from single image wherein image data of the separate image area is generated based on motion compensation of image data from both selected images.

According to a further aspect of the present invention, a signal processor for generating image data from video data of images in a video sequence is provided.

The signal processor comprises a detection unit, a scene change detector and an output calculator. The detection unit determines a separate image area relating to a different image content. The scene change detector detects a scene change between two images selected for generating new image data. The output calculator generates image data based on motion compensation if a scene change has not been detected. If a scene change has been detected, the new image data is generated based on image data from a single image wherein said image data for said separate image area are generated based on motion compensation of image data from both selected images.

It is the particular approach of the present invention to subject a ticker area to a different processing upon detecting a scene change. By maintaining a motion compensated interpolation for the ticker area while the background image data are only interpolated based on a single image, motion artefacts in the ticker area are avoided.

Preferably, the separate image area is determined based on a motion vector estimation. Accordingly, no particular indication of the separate image area is required in the received video sequence. Further, the detection of a separate image area is implemented in a simple manner as respective motion vectors are already required for the applied motion compensation. A detection of a separate image area based on motion vectors further attains to only initiate a separate processing if the separate image area would actually suffer from an interruption of motion compensated interpolation. By employing a motion vector based detection, a constantly moving image content can reliably be detected and processed differently.

Preferably, the motion vector estimation is performed between the two images selected for generating a new image data.

According to a preferred embodiment, a line or column motion vector is determined for detecting the separate image area. In this manner, the continuous motion within an image area extending between opposite image borders can be detected in a simple manner.

The line or column motion vector is preferably detected based on the motion vectors determined for a complete line or column of the image. If a common motion for almost a complete line or column can be determined, a respective motion vector is calculated.

In addition, further criteria can be taken into account for determining a separate image area. For instance, only a particular image position, namely close to the bottom of a video image is analysed in this respect. Further, the detection of a separate image area may depend on a continuous detection of corresponding motion vectors in a plurality, preferably, predetermined number of subsequent images.

Preferably, a linear interpolation is applied in order to generate a new image data from a single image in case of occurrence of a scene change.

Preferred embodiments of the present invention are the subject matter of dependent claims Other embodiments and advantages of the present invention will become more apparent from the following description of preferred embodiments, in which:

DETAILED DESCRIPTION OF THE INVENTION

The present invention relates to digital signal processing, especially to signal processing in modern television receivers. Modern television receivers employ up-conversion algorithms in order to increase the reproduced picture quality. For this purpose, intermediate images are to be generated from two subsequent images. For generating an intermediate image, the motion of moving objects has to be taken into account in order to appropriately adapt the object position within the new image to the point of time reflected by the intermediate image.

Figure 1A:
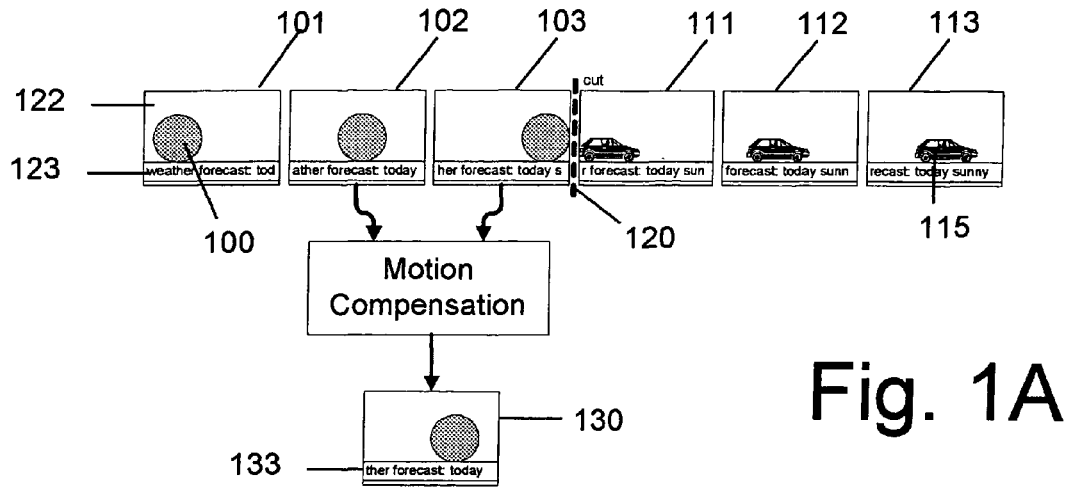
FIG. 1A-FIG. 1C illustrate an improved motion compensated interpolation.
Figure 1B:
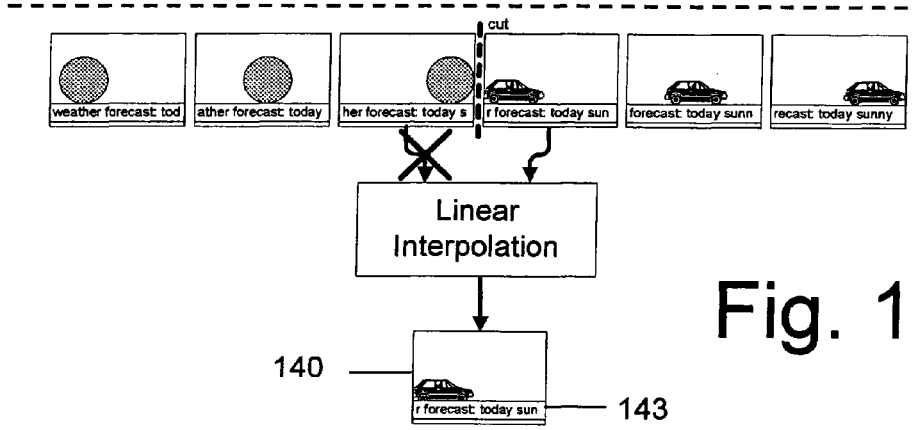
Figure 1C:
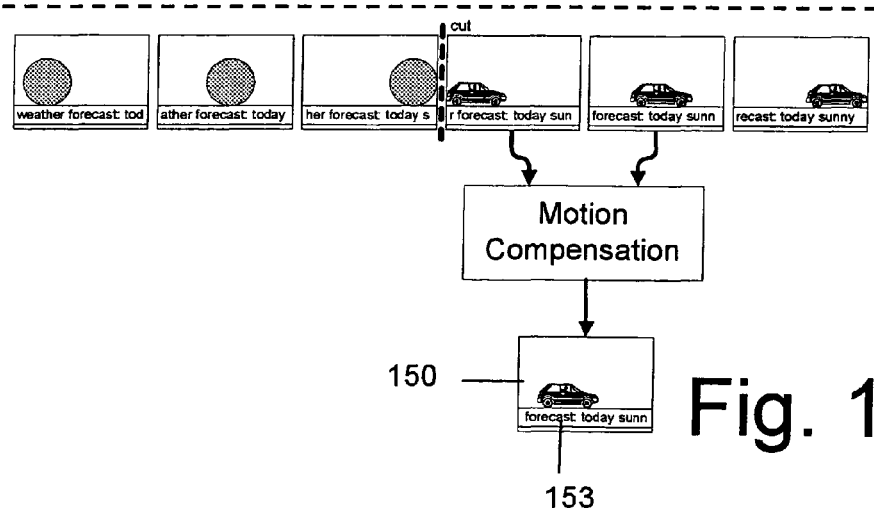

As described in connection with FIG. 1B, motion compensated interpolation algorithms which suspend motion compensation upon detecting a scene change, deteriorate the image quality of a ticker window. As can be seen in FIG. 1, the text banner of the ticker window is shifted between the images by a constant shift of two characters. When generating intermediate images between the images 101-113 of the input video sequence, the motion compensated text banner is shifted in accordance with the detected motion and temporal image position, in the illustrated example by one character with respect to the adjacent images.

However, upon detecting a scene cut 120, motion compensation is suspended for the complete image and the text banner 143 of the newly generated image 140 does not differ from that of the current image 111. Thus, a smooth motion of a text banner cannot be achieved and the viewer will notice a jerky appearance thereof.

In order to overcome this drawback, the present invention processes image data of a text banner and a background image individually. As illustrated in FIG. 2B, a motion compensated interpolation is suspended for a background image and a linear interpolation 220, 224 applied for the image portions of the background image 242. In contrast, the image area of the text banner 243 is generated based on motion compensated interpolation 222.

By applying different signal processing algorithms for up-conversion to a ticker window, motion artefacts can be avoided and an interpolation result of high image quality achieved.

Figure 2A:
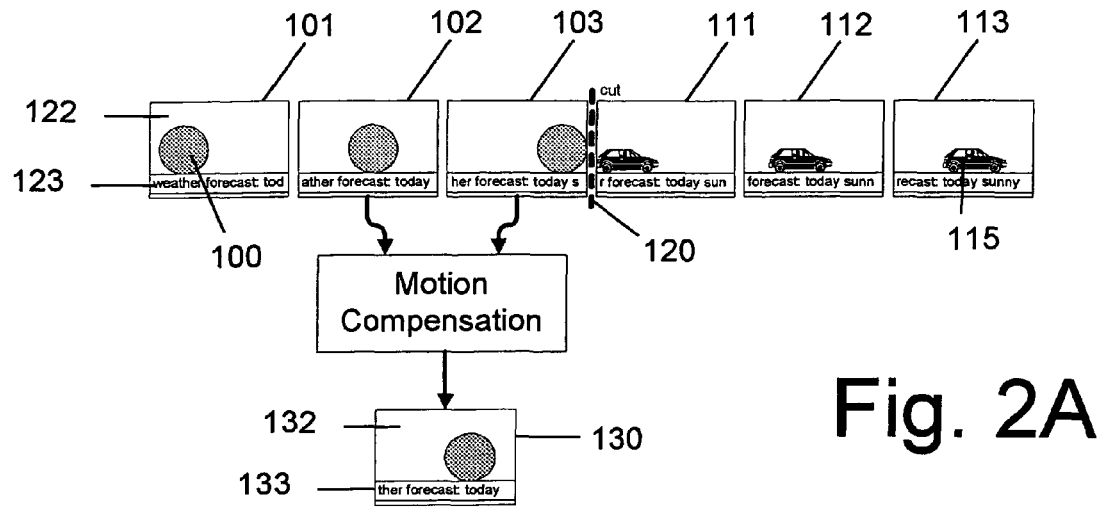
FIG. 2A-FIG. 2C illustrate an improved motion compensated interpolation in accordance with the present invention.
Figure 2B:
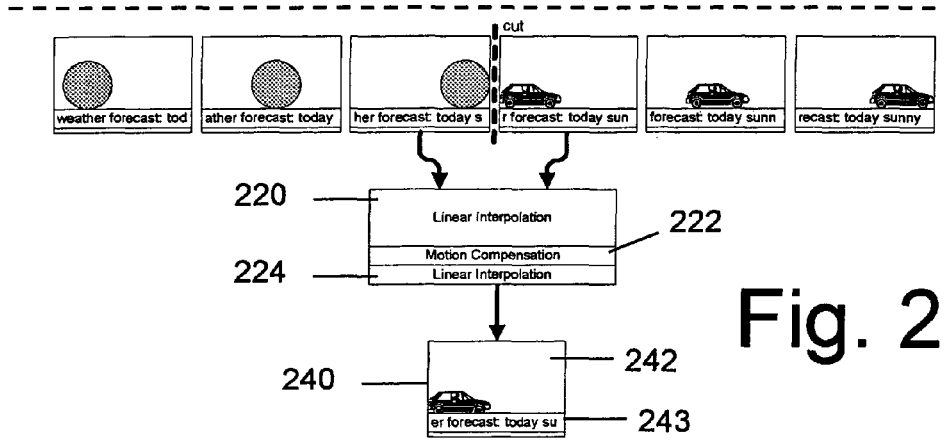
Figure 2C:
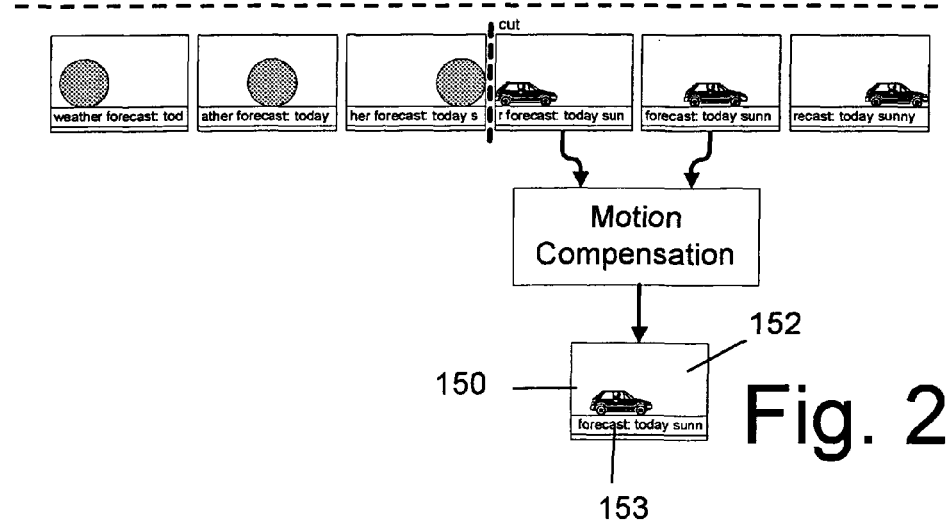

As shown in FIGS. 2A to 2C, the image content of the background image area 122 and of the ticker area 123 are processed based on motion compensated interpolation as long as no scene change 120 occurs. Motion compensated interpolation is applied to the whole image area to generate intermediate images 130, 150 including interpolated background image data 132, 152 and ticker image data 133, 153.

Upon detecting a scene change 120, a split signal processing approach is applied. While the background image area 220, 224 is subjected to linear interpolation of the current image data to generate interpolated background image data 242, the ticker window area is subjected to motion compensation 222 in order to appropriately take the continuous motion of the text banner into account during interpolation.

The ticker area to be processed differently is preferably detected based on a line or row vector detector. A row vector detector marks that area having the same horizontal motion vector. The ticker area has a temporal relation to the previous input fields. Based on the determined corresponding motion information, motion compensation can be performed for the ticker area. This different processing for the ticker area results in a smooth and uniform movement of the ticker after a scene change occurs. The determination of a line or column motion vector for a ticker area detection is described next.

Figure 3:
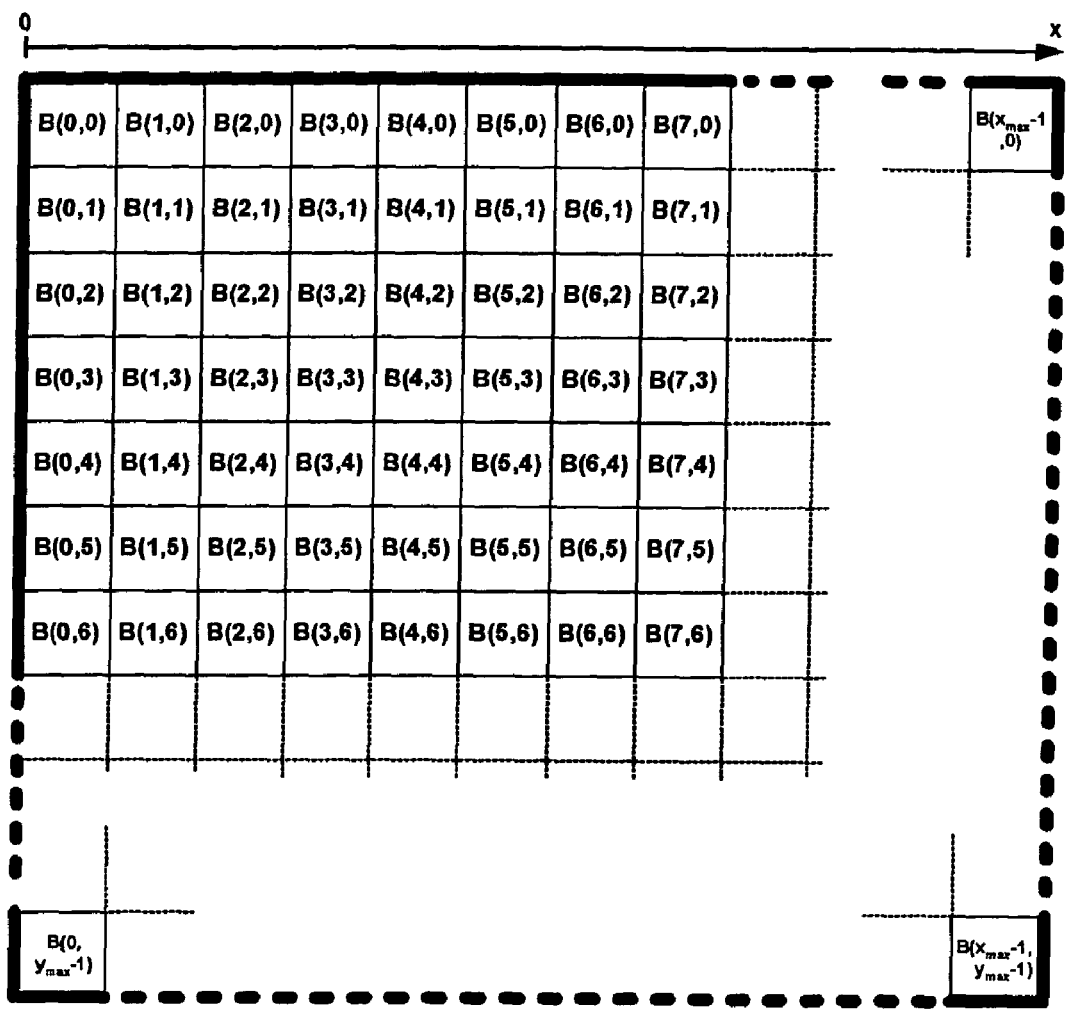
FIG. 3 illustrates a division of an image into a plurality of blocks of uniform size.

FIG. 3 illustrates the division of each video image into a plurality of blocks B(x; y). Each block has a width X and a height Y wherein X and Y represent the number of pixels in the line and column direction, respectively. The number of blocks per line or column can be calculated by employing the following formulas:

$$x_{max} = \text{Pixels per line}/X$$

$$y_{max} = \text{Pixels per column}/Y$$

In order to accurately determine the uniform motion of all blocks of larger image areas, i.e. a ticker area, the motion of a complete line or column of blocks is determined. In case of motion that occurs in a predominant number of blocks in a line or column, the line or column vector corresponds to the motion of the largest object in this line or column.

As soon as the motion vector determination for a current image n (field or frame) has been completed, the calculation of respective line and column vectors is started. The calculated line and column vectors are provided for use during motion estimation of the next field or frame.

First, motion vectors of a minor length are excluded from being taken into account. For this purpose, the motion vector $\vec{v}$ of each block is compared to a predefined threshold value $v_{thr}$. The result therefore is reflected in a binary "vecthr" flag assigned to each of the blocks. This flag is calculated as indicated by equation (1):

$$vecthr[(x, y), n] = \begin{cases} i, & \text{if } (\vec{v}[(x, y), n] > \vec{v}_{thr}) \\ 0, & \text{else} \end{cases} \quad (1)$$

Preferably, the set of motion vectors determined for all blocks of image n is revised accordingly such that those motion vectors are set to zero (0; 0) which do not exceed the predefined threshold value $v_{thr}$. This revision is reflected by equation (2):

$$\vec{v}_{thresholded}[(x, y), n] = \begin{cases} \vec{v}[(x, y), n], & \text{if } (vecthr[(x, y), n] > 0) \\ (0, 0), & \text{else} \end{cases} \quad (2)$$

In accordance with equation (2), a thresholded vector $\vec{v}_{thresholded}$ is calculated. The thresholded vector is set to zero if the previously calculated flag (cf. equation (1)) is zero. Otherwise, the determined vector $\vec{v}$ is assigned to the thresholded vector $\vec{v}_{thresholded}$.

For the calculation of a line or column vector, preferably a mean value of the non-zero thresholded vectors is calculated. However, a skilled person may apply any other algorithm in order to determine a motion vector representing a common motion vector for a plurality of individual motion vectors of a line or column.

For the line and column vector calculation, the individual block lengths and the number of blocks exceeding the threshold value $V_{thr}$ are accumulated as indicated by the following equations (3) to (6):

$$\vec{v}_{sum\_line}(y) = \sum_{x=0}^{x_{max}-1} \vec{v}_{thresholded}[(x, y), n] \quad (3)$$

$$\vec{v}_{sum\_column}(x) = \sum_{y=0}^{y_{max}-1} \vec{v}_{thresholded}[(x, y), n] \quad (4)$$

$$n_{sum\_line}(y) = \sum_{x=0}^{x_{max}-1} vecthr[(x, y), n] \quad (5)$$

$$n_{sum\_column}(x) = \sum_{y=0}^{y_{max}-1} vecthr[(x, y), n] \quad (6)$$

The line and column vectors $\vec{v}_{line}$, $\vec{v}_{column}$ are calculated in accordance with the following equations (7) and (8). A motion vector is only calculated if the number of blocks exceeding the predetermined threshold $v_{thr}$ for a line or column exceeds another predefined threshold $nthr_{line}$, $nthr_{column}$.

$$\vec{v}_{line}[(y), n] = \begin{cases} \dfrac{\vec{v}_{sum\_line}(y)}{n_{sum\_line}(y)}, & \text{if } (n_{sum\_line}(y) > nthr_{line}) \\ (0, 0), & \text{else} \end{cases} \quad (7)$$

$$\vec{v}_{column}[(x), n] = \begin{cases} \dfrac{\vec{v}_{sum\_column}(x)}{n_{sum\_column}(x)}, & \text{if } (n_{sum\_column}(x) > nthr_{column}) \\ (0, 0), & \text{else} \end{cases} \quad (8)$$

These calculated line and column vectors are used in the following field/frame as additional candidate vectors during motion estimation.

Referring to the above-mentioned thresholds $v_{thr}$, $nthr_{line}$, $nthr_{column}$, preferably the following values are employed:

$$\vec{v}_{thr} = 4$$

$$nthr_{line} = x_{max}/2 \text{ (45 for PAL standard and X=8)}$$

$$nthr_{column} = y_{max}/2 \text{ (36 for PAL standard and Y=8)}$$

wherein $x_{max}$ and $y_{max}$ represent the total width/height of a field or frame. The values are preferably employed for a block size of 8×8 pixels.

While the above description is based on the assumption that line and column vectors are calculated for each individual line and column, a common motion vector may additional or alternatively be calculated for combinations of two lines or two columns. A two line or two column motion vector may further increase the motion accuracy for objects representing the predominant motion within two lines or two columns.

Hardware complexity may be reduced in avoiding any overlapping caused by the combination of plural lines or columns.

In the same manner, more than two lines and columns, for instance three, four or five, may be combined in order to provide a motion, vector of increased accuracy for objects of a respective size.

While the threshold vector $v_{thr}$ has been described to be set uniformly for a line and column vector calculation, different thresholds may be employed for a line and a column. In addition, threshold vector $v_{thr}$ may be split into two different thresholds applicable for a horizontal motion vector component and a vertical motion vector component.

Figure 4:
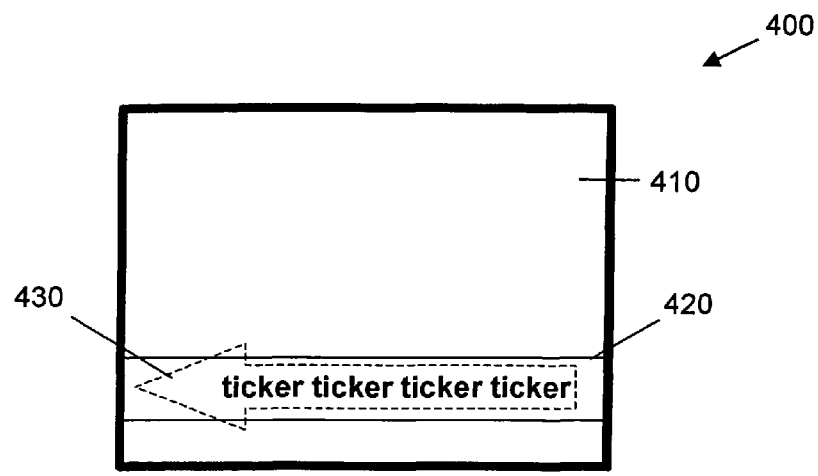
FIG. 4 illustrates a detected motion vector reflecting the presence of a ticker window.

FIG. 4 illustrates an example of an image 400 including a ticker area 420. The ticker area 420 overlaid on background image 410 is detected based on line vector 430.

Figure 5:
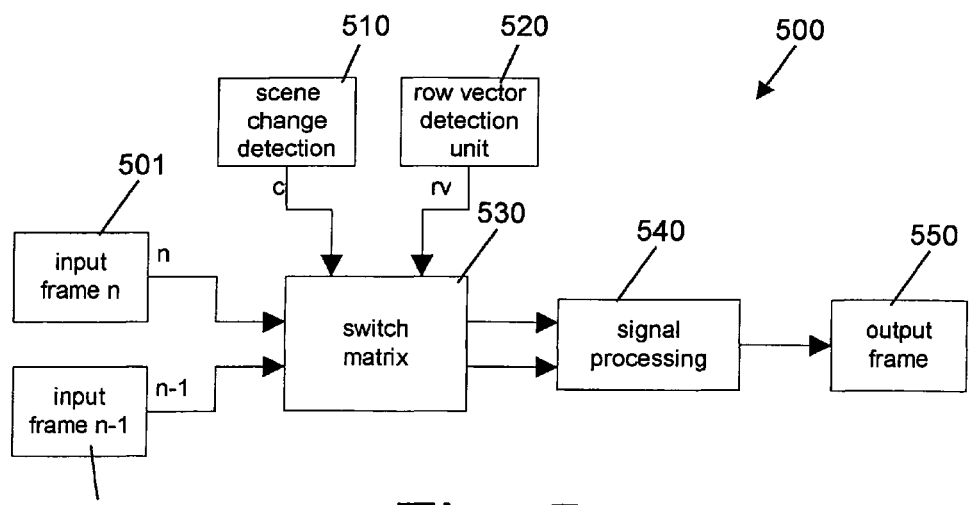
FIG. 5 illustrates in block diagram form, a configuration of a signal processor in accordance with the present invention.

A configuration of a signal processor 500 in accordance with the present invention is illustrated in FIG. 5. Signal processor 500 receives two input images 501, 502 from subsequent image positions n, n−1. A scene change detector 510 included in signal processor 500 determines whether or not a scene change 120 occurs between both images 501, 502. Whether or not a scene change has been detected is indicated by output signal c.

Signal processor 500 further comprises a line or row vector detection unit 520 determining whether or not a line vector has been detected. The detection result is indicated by output signal rv.

In accordance with the detection result c of scene change detector 510 and the detection result rv of row vector detection unit 520, switch matrix 530 forwards the required data from input images 501, 502 together with the required processing to signal processing unit 540. Signal processing unit 540 performs the required motion compensated interpolation or linear interpolation and generates output image data 550.

In accordance with the received scene change and row vector detection results c, rv, switch matrix 530 submits the respective input fields 501, 502 and the processing to be replied to signal processing unit 540. In accordance with the detection results, the following processing is indicated to signal processing unit 540:

1. c=no scene change detected
   rv=not used
   motion compensation between n and n−1
2a. c=scene change detected
   rv=no row vector
   linear interpolation of n in the area without row vector
2b. c=scene change detected
   rv=row vector
   motion compensation between n and n−1 in the area with row vector Although the previous description mainly refers to images, a skilled person is aware that these images may either be fields or frames.

Summarizing, the present invention relates to an improved motion compensated interpolation of images in video sequences, in particular, for use in up-conversion processing.

In order to achieve a smooth object motion in the interpolated image sequence, separate image areas are processed differently if an image change occurs in the video sequence. While for one image area motion compensation is suspended, the other image area is subjected to motion compensated interpolation.

The invention claimed is:

1. A method for generating new image data from video data of images, where each image is subdivided into blocks in a video sequence, the method comprising:
   detecting, using a scene change detector, a scene change between two images selected for generating new image data;
   determining, using a detection unit, a separate image area within each of the two images selected, the separate image area relating to different content than a content of a remaining image portion in each of the two images selected, and the separate image area being at least a line or column of blocks with a common motion vector;
   generating, using an output calculator, new image data based on motion compensation that is applied to the two images selected if a scene change has not been detected using the scene change detector; and
   generating, using the output calculator, new image data for a new image corresponding to the separate image area within each of the two images selected based on motion compensation of image data from the two images selected if a scene change has been detected, and generating new image data in a remaining portion of the new image outside of the separate image area within each of the two images selected based on interpolation of image data from a single selected image,
   wherein when a scene change has been detected the new image data of the separate image area is generated differently from the new image data outside the separate image area.

2. A method according to claim 1, wherein a motion vector estimation for determining the common motion vector is performed between the two images selected for generating new image data.

3. A method according to claim 1, wherein a motion vector estimation determines a line or column motion vector by using a row vector detection unit.

4. A method according to claim 3, wherein the line or column motion vector is determined using the row vector detection unit based on the motion vectors estimated for blocks in a line or column of blocks.

5. A method according to claim 4, wherein the motion vector estimation using the row vector detection unit is performed on a block basis and the line or column motion vector is calculated based on the blocks of a complete line or column of blocks.

6. A method according to claim 4, wherein the only motion vectors of blocks that are taken into account for the line or column motion vector estimation using the row vector detection unit are those which exceed a predefined threshold.

7. A method according to claim 1, wherein the two selected images are current and previous images.

8. A method according to claim 1, wherein the interpolation performed using the output calculator is based on a single image being a linear interpolation of a current image.

9. A method according to claim 1, wherein the step of detecting a scene change using the scene change detector, further comprises:
   accumulating, using an accumulator, absolute pixel differences determined between the two selected images;

comparing, using a comparator, the accumulated sum to a predefined threshold; and detecting a scene change if the accumulated sum exceeds a predefined threshold.

10. A method according to claim 1, wherein the separate image area is image data overlaid on background image data of the video sequence.

11. A method according to claim 1, wherein the separate image area is a ticker window.

12. A method according to claim 10, wherein the separate image area is detected by detecting a line motion vector.

13. A signal processor for generating new image data from video data of images, where each image is subdivided into blocks in a video sequence, comprising:
   a scene change detector for detecting a scene change between two images selected for generating new image data;
   a detection unit for determining a separate image area within each of the two images selected, the separate image area relating to different content than a content of a remaining image portion in each of the two images selected, and the separate image area being at least a line or column of blocks with a common motion vector;
   an output calculator for generating new image data of a new image corresponding to the separate image area within each of the two images selected based on motion compensation of image data from the two images selected if a scene change has been detected, and generating new image data in a remaining portion of the new image outside of the separate image area within each of the two images selected based on interpolation of image data from a single selected image,
   wherein when a scene change has been detected the new image data of the separate image area is generated differently from the new image data outside the separate image area.

14. A signal processor according to claim 13, wherein the common motion vector estimated reflects motion between the separate image areas in the two images selected for the generation of new image data.

15. A signal processor according to claim 13, wherein the detection unit determines a line or column motion vector based on motion vectors estimated for blocks in a line or column of blocks.

16. A signal processor according to claim 15, wherein the received motion vectors indicate motion on a block basis and the detection unit calculates the line or column motion vector based on the blocks of a complete line or column of blocks.

17. A signal processor according to claim 15, wherein the detection unit only takes the motion vectors into account for the line or column motion vector estimation which exceed a predefined threshold.

18. A signal processor according to claim 13, wherein the two images selected are current and previous images.

19. A signal processor according to claim 13, wherein the output calculator generates the new image data based on a linear interpolation of image data from a current image.

20. A signal processor according to claim 13, wherein the scene change detector comprises:
   an accumulator for accumulating absolute pixel differences determined between the two images selected; and
   a comparator for comparing the accumulated sum to a predefined threshold, and detecting a scene change if the accumulated sum exceeds a predefined threshold.

21. A signal processor according to claim 13, wherein the separate image area is image data overlaid on background image data of the video sequence.

22. A signal processor according to claim 13, wherein the separate image area is a ticker window.

23. A signal processor according to claim 21, wherein the detection unit detects the separate image area by detecting a line motion vector.

* * * * *